United States Patent
Buehler et al.

(10) Patent No.: US 7,165,935 B2
(45) Date of Patent: Jan. 23, 2007

(54) AXIAL COMPRESSOR

(75) Inventors: Sven Buehler, Zurich (CH); Charles Raymond Matz, Neuenhof (CH)

(73) Assignee: ALSTOM Technology Ltd., Baden (CH)

( * ) Notice: Subject to any disclaimer, the term of this patent is extended or adjusted under 35 U.S.C. 154(b) by 190 days.

(21) Appl. No.: 10/931,065

(22) Filed: Sep. 1, 2004

(65) Prior Publication Data

US 2005/0063819 A1    Mar. 24, 2005

(30) Foreign Application Priority Data

Sep. 10, 2003  (DE)  ............................ 103 42 097

(51) Int. Cl.
*F01D 25/00*  (2006.01)
*F02C 7/00*  (2006.01)
(52) U.S. Cl. .................. 415/116; 415/162; 415/199.5; 416/147; 60/39.53; 60/775
(58) Field of Classification Search ............ 415/116, 415/117, 162; 416/147
See application file for complete search history.

(56) References Cited

U.S. PATENT DOCUMENTS 4,295,784 A * 10/1981 Manning ................. 415/162
5,867,977 A    2/1999 Zachary et al.
6,286,301 B1 * 9/2001 Utamura ................. 60/39.53
6,398,518 B1   6/2002 Ingistov

FOREIGN PATENT DOCUMENTS

| DE | 844 632 | 7/1952 |
|---|---|---|
| DE | 44 07 829 A1 | 9/1995 |
| WO | 03/048544 A1 | 6/2003 |

OTHER PUBLICATIONS

Search Report from DE 103 42 097.5 (Apr. 1, 2004).

* cited by examiner

*Primary Examiner*—Richard A. Edgar
(74) *Attorney, Agent, or Firm*—Cermak & Kenealy, LLP; Adam J. Cermak

(57) ABSTRACT

In an axial compressor (10), in particular for a gas turbine, with a plurality of stages (ST1, . . . , ST5) which are arranged one behind the other between a compressor inlet (14) and a compressor outlet (15) and include in each case at least one ring of rotor blades (R) and one ring of stator blades (S), a substantial improvement is achieved in that, to minimize the losses in the individual stages (ST1, . . . , ST5), during operation of the axial compressor (10) in which water is injected into the compressor inlet (14) and evaporates on its way though the compressor (10) (what is known as "wet compression"), the variations, caused by the injected water, in the flow velocities (c1, cm1, w1) of the medium flowing though the compressor (10) are largely compensated by a controlled change in the geometry of the blades (R, S).

5 Claims, 6 Drawing Sheets

US 7,165,935 B2

AXIAL COMPRESSOR

This application claims priority under 35 U.S.C. § 119 to German application number 103 42 097.5, filed 10 Sep. 2003, the entirety of which is incorporated by reference herein.

BACKGROUND OF THE INVENTION

1. Field of the Invention

The present invention relates to the field of gas turbines, and is concerned with an axial compressor.

2. Brief Description of the Related Art

Injection of water into the compressor of a gas turbine has been known for some length of time as a means for increasing the output of the gas turbine plant (see, for example, U.S. Pat. No. 5,867,977 or WO-A1-03/048544). On the other hand, however, it is also true that the aerodynamic efficiency of the compressor stages is not optimum in operation with water injection. This means that mismatching effects with regard to the impingement of the flow onto the blades occur, such effects becoming the more significant, the more water is injected into the compressor. Injection quantities of up to 2% of the mass intake flow of dry air are already being considered at the present time, and in future the injected quantities will perhaps be even greater.

The mismatching of the blades optimized for dry operation to the on flow conditions within the compressor stages, said on flow conditions changing with the injection of water, leads to increased losses in the stages, these losses lowering the efficiency of the plant.

SUMMARY OF THE INVENTION

An aspect of the present invention is specifying an axial compressor which is designed in a simple way, such that the mismatchings initially mentioned and their consequences can be avoided and the advantages of water injection for power generation can be fully utilized.

An aspect of the present invention is largely to compensate for the variations, caused by the injected water, in the flow velocities of the medium flowing through the compressor by means of a controlled change in the geometry of the blades. By virtue of this change in geometry, it is possible, despite the water injection, to remain within the optimum region of the curve which describes the dependence of the loss in a compressor stage from the angle of the relative flow velocity of the medium flowing into the stage.

Water injected into the compressor on the inlet side has a different effect on the individual stages of the compressor on account of the evaporation taking place successively in the compressor. Different matchings of the compressor stages must also be carried out correspondingly. A preferred refinement of the invention is therefore distinguished in that, in the stages in which the axial flow velocity of the medium increases due to the injection of the water, the noses of the blades are varied toward a more open position, and in that, in the stages in which the axial flow velocity of the medium decreases due to the injection of the water, the noses of the blades are varied toward a more closed position.

In particular, it is such that, when the axial compressor comprises a middle stage in which the injection of water influences the axial flow velocity only insignificantly, in the stages arranged upstream of the middle stage in the flow direction the noses of the blades are varied toward a more open position, and such that, in the stages arranged downstream of the middle stage in the flow direction, the noses of the blades are varied toward a more closed position.

In the case of an injection of water of the order of magnitude of 2% of the dry mass air flow at the compressor inlet, the geometry of the stages arranged upstream of the middle stage in the flow direction is varied in such a way that the angle of the relative flow velocity of the medium flowing into the stage is increased in each case by about 2°, and the geometry of the stages arranged downstream of the middle stage in the flow direction is varied in such a way that the angle of the relative flow velocity of the medium flowing into the stage is reduced in each case by about 2.5°.

BRIEF DESCRIPTION OF THE DRAWINGS

The invention will be explained in more detail below with reference to exemplary embodiments, in conjunction with the drawing in which.

DETAILED DESCRIPTION OF THE PREFERRED EMBODIMENTS

Figure 6:
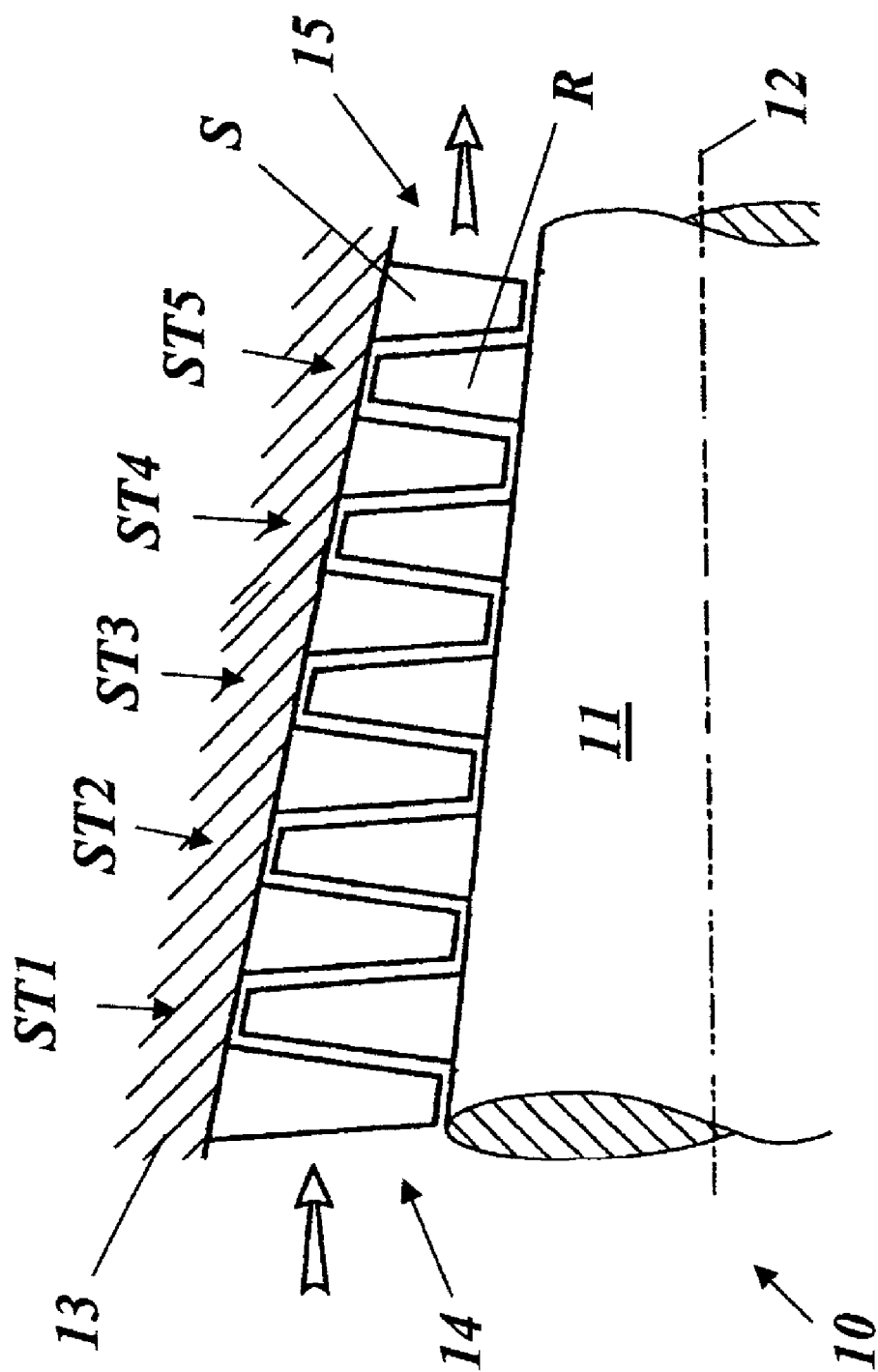
FIG. 6 shows diagrammatically the set-up of a multistage axial compressor which is the subject of the present invention.

The invention proceeds from an axial compressor 10 such as is reproduced diagrammatically in FIG. 6. The axial compressor 10 has a rotor 11 which is arranged concentrically in a stator 13 rotatably about a rotor axis 12. The axial compressor 10 has a plurality of compressor stages ST1, . . . , ST5 which are arranged one behind the other in the axial direction between a compressor inlet 14 and a compressor outlet 15. The stages ST1, . . . , ST5 comprise in each case a ring of rotor blades or moving blades R and a ring of stator vanes or guide vanes S. A medium, in particular air, flows through the axial compressor from the compressor inlet 14 to the compressor outlet 15 and is compressed. If the compressor is part of a gas turbine, the compressed air serves as combustion air in the burner of the gas turbine.

Figure 1:
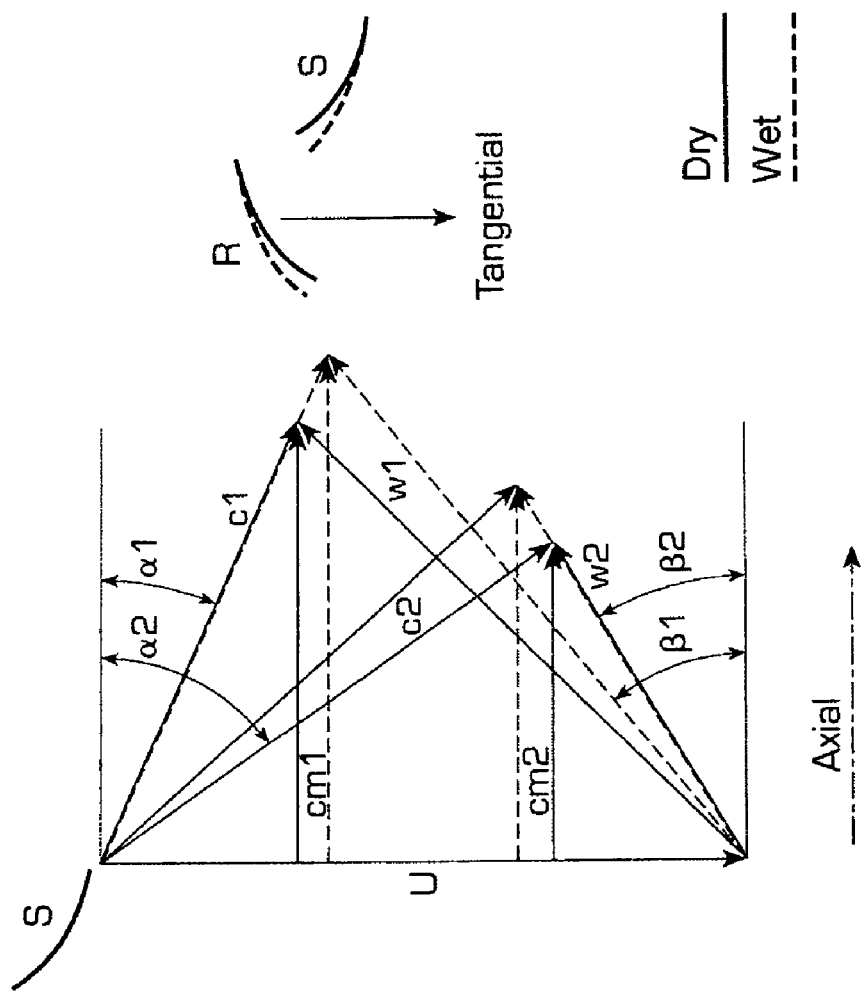
FIG. 1 shows a graph of a velocity triangle for a stage arranged in the front part of the compressor, for dry operation and operation with water injection.
Figure 2:
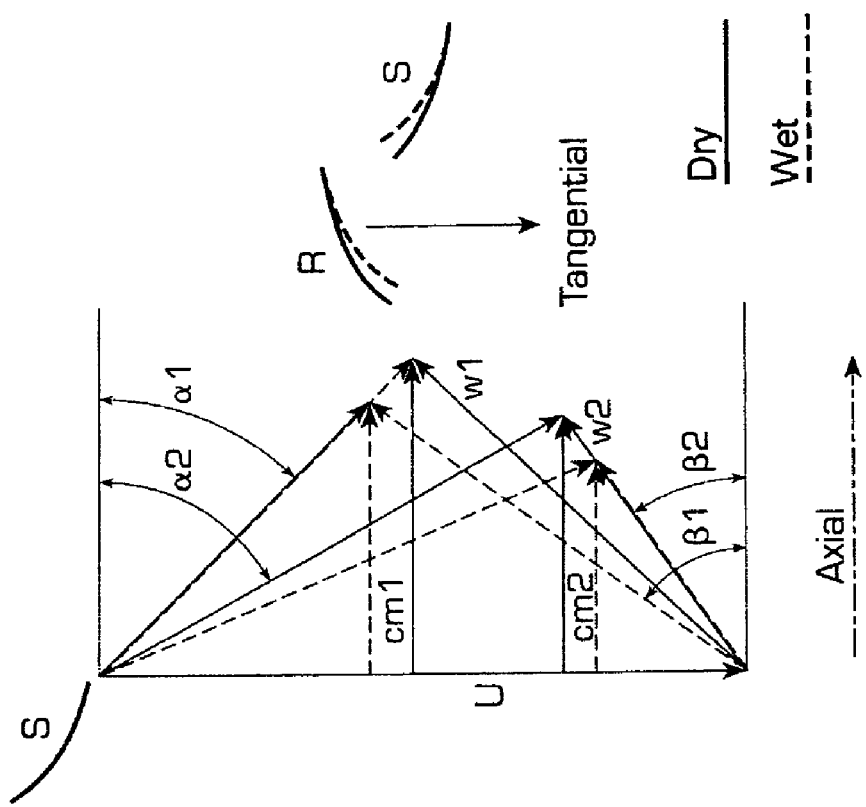
FIG. 2 shows a graph of a velocity triangle for a stage arranged in the rear part of the compressor, for dry operation and operation with water injection.

As can be seen from the illustration of the rotor blades R and stator vanes S in FIGS. 1 and 2, the rotating rotor blades R impart a flow velocity to the medium flowing though the compressor. The stator vanes S bring about subsequent deflection before the medium to be compressed enters the next stage. The rotor blades R have a linear rotor velocity U. The absolute flow velocities of the medium at the inlet and at the outlet of the stage are c1 and c2 respectively. They form, with the axial direction, an angle $\alpha_1$ and $\alpha_2$, respectively. The relative flow velocities of the medium with respect to the rotor blades R at the inlet and the outlet of the stage are w1 and w2, respectively. They form, with the axial direction, an angle $\beta_1$ and $\beta_2$, respectively. The components of the absolute flow velocity c1 and c2 in the axial direction are designated by cm1 and cm2, respectively. The situation without water injection ("dry"; unbroken lines) and with water injection ("wet"; dotted lines) are compared in each case in FIGS. 1 and 2. The various flow velocities U, c and w in this case form a characteristic velocity triangle. The situation illustrated in FIG. 1 applies to the stages affanged in the front region of the compressor; the situation illustrated in FIG. 2 applies to the stages arranged in the rear region.

According to FIG. 1, the evaporation of the injected water in the front stages leads to a rise in the axial flow velocity cm1 and cm2 (transition from the vector depicted by unbroken lines to the vector depicted by dotted lines). This entails a change (reduction) in the angle $\beta_1$. On the associated curve, illustrated in FIG. 3, of the cascade losses as a function of the entry angle of the blade cascade (the circles stand for SD=standard design; the triangles stand for EWD=design with entry angle change), in the case of a reduction in the angle the associated dots (circles) travel to the left toward the "interlock limit" side of the curve and lead to increased losses ("delta loss") in the stage. In order to avoid the losses associated with this angle change, then, the rotor blades R are varied in their geometry in such a way that they have from the outset an additional angular amount with respect to the relative flow velocity. The starting point for operation without water injection therefore no longer lies at the absolute minimum of the loss curve of FIG. 3. The dots on the loss curve which belong to a specific percentage of water injection are displaced to the right; the circles merge into assigned triangles which correspond in each case to an angle which is about 2° higher. If, then, water is injected increasingly into the compressor, the triangles reach the minimum value of the loss curve in the case of a water injection of about 2% of the dry mass intake air flow, so that the loss is not increased as a result of water injection, but is minimized. According to FIG. 1, the preset angle increase is achieved in that the noses of the rotor blades R and subsequent stator blades S are varied in the direction of greater opening (dotted lines of the blades R and S in FIG. 1).

As regards the stages of the compressor 10 which are arranged in the rear region, the conditions are exactly reversed (FIGS. 2 and 4): the increased density of the flowing medium, which is a consequence of cooling by the evaporating water, leads to a decrease in the axial flow velocity cm1 and cm2, as compared with operation without water injection. The associated operating dots (circles) on the loss curve of FIG. 4 thereby travel to the right toward the "breakaway" side of the curve and thus cause higher losses. By a presetting in the form of a reduced angle (transition from the circles to the left to the triangles in FIG. 4), here too, a loss increasing with water injection can be prevented. The noses of the blades R and S are varied toward a more closed geometry according to the dotted curves in FIG. 2. ("choke biasing").

Figure 3:
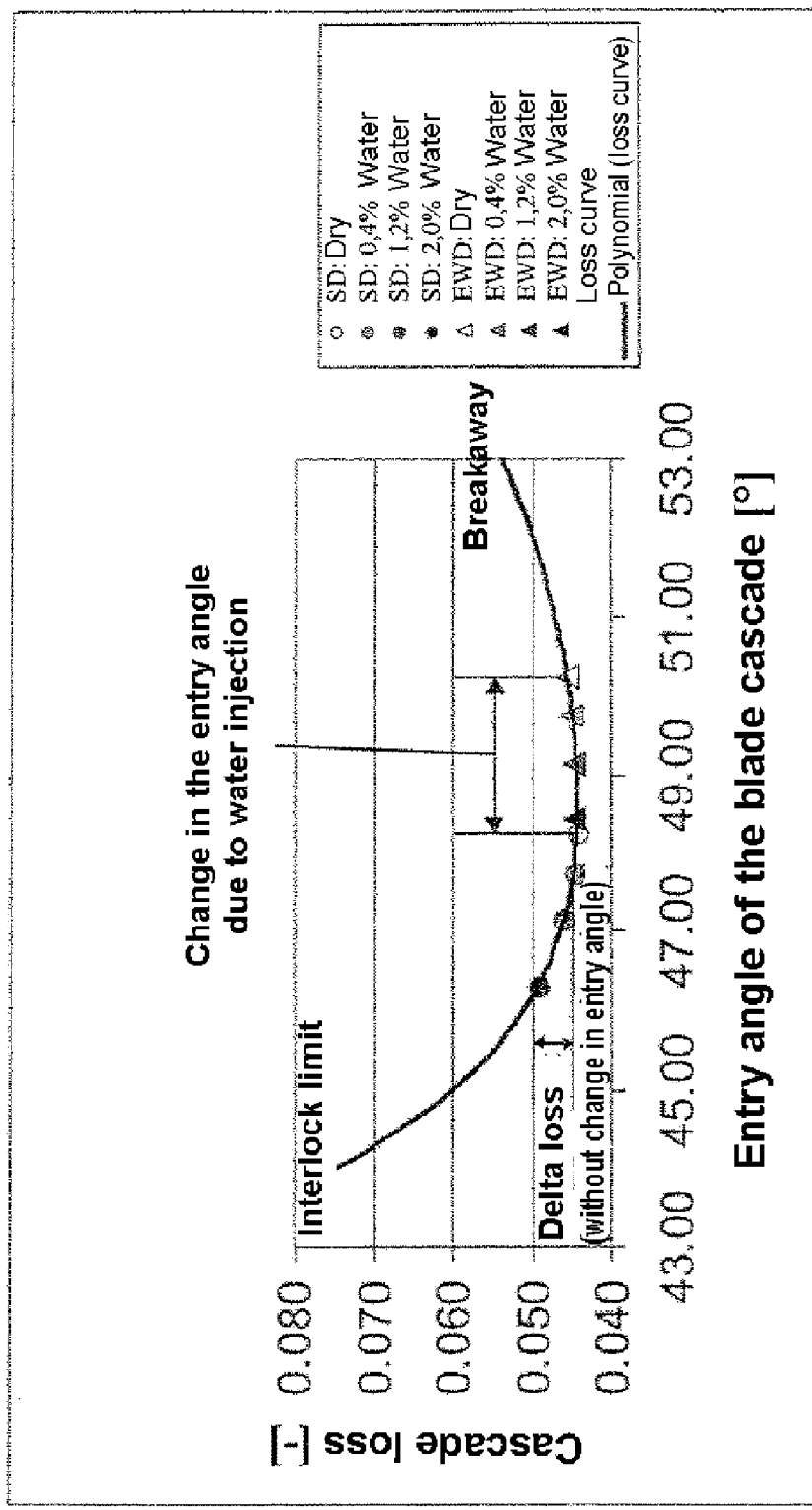
FIG. 3 shows the change in the cascade loss with increasing water injection in the case of conventional blade geometry and in the case of blade geometry varied according to the invention, for a stage arranged in the front part of the compressor.
Figure 4:
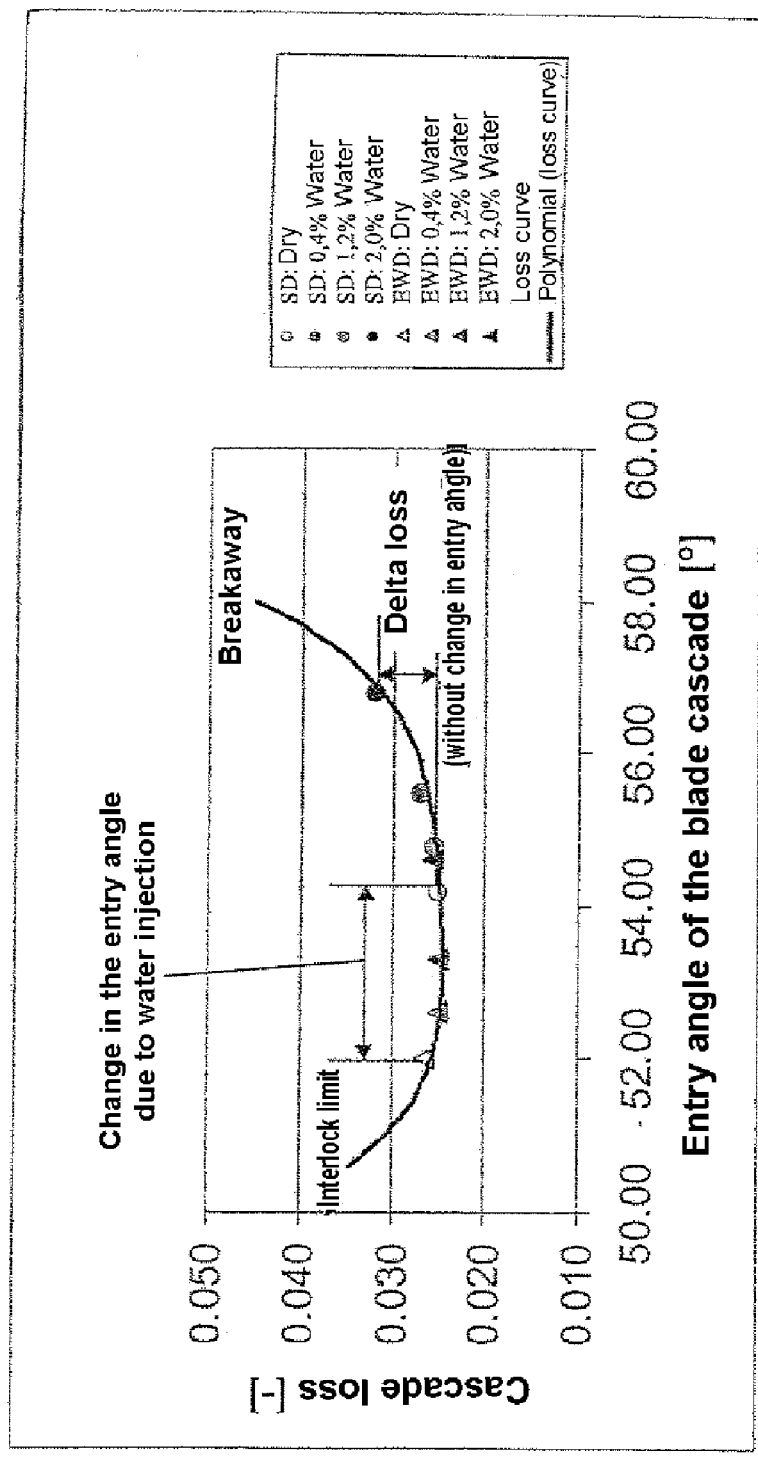
FIG. 4 shows the change in the cascade loss with increasing water injection in the case of conventional blade geometry and in the case of blade geometry varied according to the invention, for a stage arranged in the rear part of the compressor.

As can easily be seen from FIGS. 3 and 4, by the variation in geometry of the blades the flat minimum region of the loss curves is fully utilized. For this purpose, the angle of the relative flow velocity is displaced in such a way that the operating point of the entire range of water injection moves up to 2% virtually over the broad minimum region of the curve. The positive overall effect of the presetting may in this case amount to one percent or more in terms of compressor efficiency.

Figure 5:
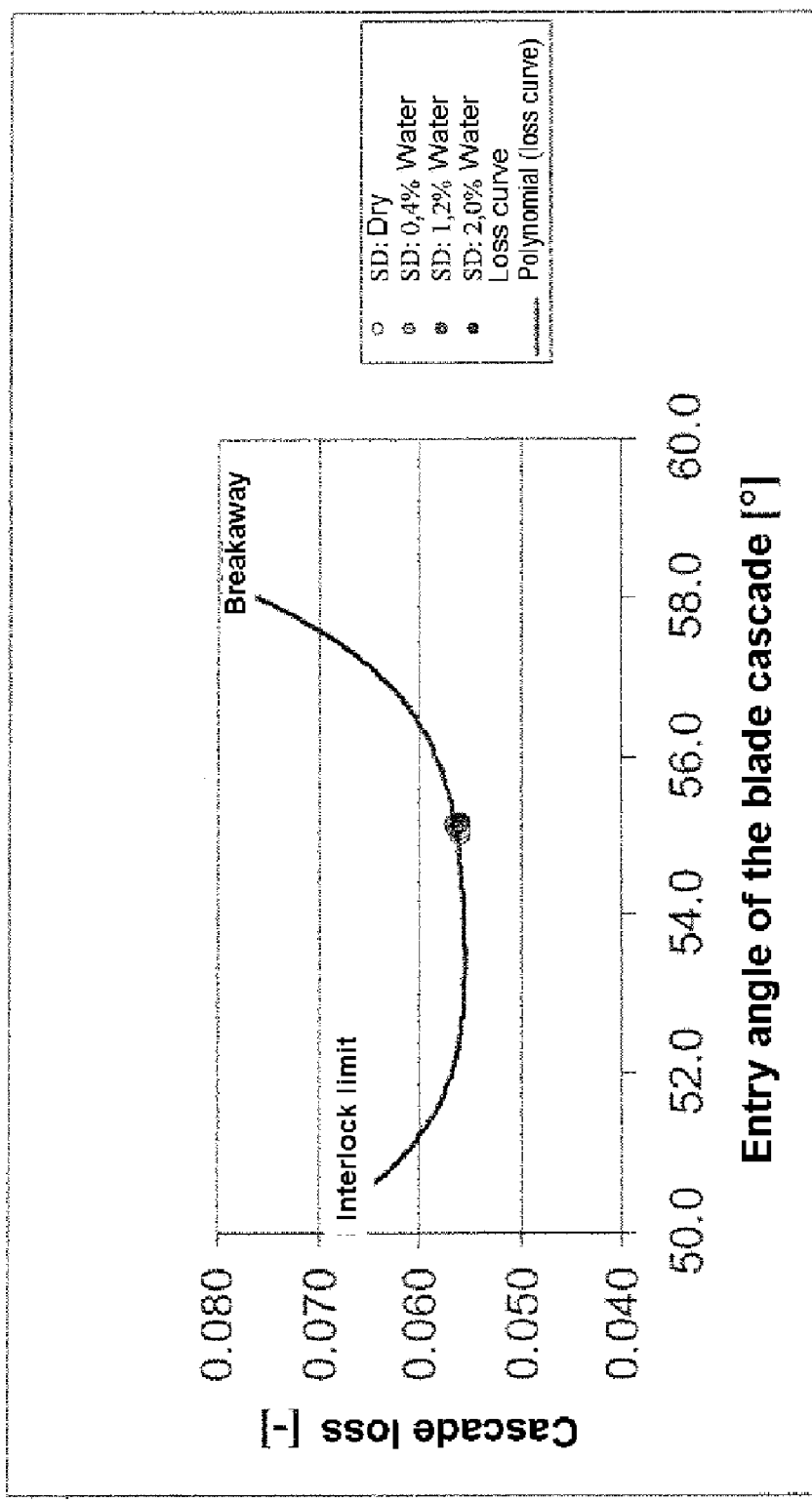
FIG. 5 shows the constancy of the cascade loss in the case of changing water injection for a middle stage of the compressor with conventional blade geometry.

The stages which are arranged in the front region of the axial compressor 10 and in which a presetting toward the "breakaway" side is used according to FIG. 1 and FIG. 3 and the stages which are arranged in the rear region of the axial compressor 10 and in which a presetting toward the "interlock limit" side is used according to FIG. 2 and FIG. 4 are conventionally separated from one another by means of a middle neutral stage in which water injection causes virtually no displacement on the loss curve and therefore also no rising losses according to FIG. 5. A change in the blade geometry (presetting) may be dispensed with, without any disadvantages, in this stage.

LIST OF REFERENCE SYMBOLS

10 Axial compressor
11 Rotor
12 Rotor axis
13 Stator
14 Compressor inlet
15 Compressor outlet
ST1, . . . , ST5 Stage
R Rotor blade
S Stator blade
$\alpha_1, \alpha_2$ Angle of the absolute flow velocity c
$\beta_1, \beta_2$ Angle of the relative flow velocity w
c1, c2 Absolute flow velocity
cm1, cm2 Axial flow velocity
U Linear flow velocity
w1, w2 Flow velocity relative to the rotor blade While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. An axial compressor for compressing air, said compressor comprising:
   a compressor inlet and a compressor outlet;
   a plurality of stages arranged one behind the other between the compressor inlet and the compressor outlet, each stage comprising at least one ring of rotor blades and one ring of stator vanes; and
   means for injecting water into an air stream entering the compressor inlet, for resulting in a wet compression;
   wherein there exists a first geometric configuration for each of the rotor blades and stator vanes of the compressor stages, which first geometric configuration is optimized for the compression of air without water injection; and
   wherein there exists a second geometric configuration for each of the rotor blades and stator vanes of the compressor stages, which second geometry differs from said first geometric configuration and is optimized for wet compression by compensating for the variations, caused by injected water, in the flow velocities of the medium flowing though the compressor; and
   wherein the rotor blades and stator vanes of the compressor stages comprise said second geometric configuration.

2. The axial compressor as claimed in claim 1, wherein:
   in the stages in which an axial flow velocity of the medium increases due to the injection of the water, the noses of the rotor blades and stator vanes have a more open position than in the first geometric configuration; and in the stages, in which the axial flow velocity of the medium decreases due to the injection of the water, the noses of the rotor blades and stator vanes have a more closed position, than in the first geometric configuration.

3. The axial compressor as claimed in claim 2, further comprising:

a middle stage configured and arranged such that the injection of water influences the axial flow velocity only insignificantly;

wherein, in the stages arranged upstream of the middle stage in the flow direction, the noses of the rotor blades and stator vanes have a more open position, than in the first geometric configuration; and wherein, in the stages arranged downstream of the middle stage in the flow direction, the noses of the rotor blades and stator vanes have a more closed position, than in the first geometric configuration.

4. The axial compressor as claimed in claim 3, wherein:

the means for injecting water comprises means for injecting water of the order of magnitude of 2% of the dry air mass flow at the compressor inlet;

the second geometricy configuration of the rotor blades and stator vanes of the stages arranged upstream of the middle stage in the flow direction differs from the first geometric configuration, so that the angle of the relative flow velocity of the medium flowing into the stage is increased by about 2°; and the second geometric configuration of the rotor blades and stator vanes of the stages arranged downstream of the middle stage in the flow direction differs from the first geometric configuration, so that the angle of the relative flow velocity of the medium flowing into the stage is reduced by about 2.5°.

5. The axial compressor as claimed in claim 1, configured and arranged for use in a gas turbine.

* * * * *